(12) United States Patent
Kuhn et al.

(10) Patent No.: US 11,982,367 B2
(45) Date of Patent: May 14, 2024

(54) VALVE DEVICE HAVING A VALVE SITTING IN A VALVE SOCKET

(71) Applicant: Schaeffler Technologies AG & Co. KG, Herzogenaurach (DE)

(72) Inventors: Lukas Kuhn, Oberreichenbach (DE); Horst Hartmann, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/010,199

(22) PCT Filed: Jun. 9, 2021

(86) PCT No.: PCT/DE2021/100493
§ 371 (c)(1),
(2) Date: Dec. 13, 2022

(87) PCT Pub. No.: WO2022/002302
PCT Pub. Date: Jan. 6, 2022

(65) Prior Publication Data
US 2023/0250886 A1    Aug. 10, 2023

(30) Foreign Application Priority Data
Jun. 29, 2020 (DE) ............... 10 2020 116 992.2

(51) Int. Cl.
*F16K 15/06* (2006.01)
*F16K 27/04* (2006.01)

(52) U.S. Cl.
CPC .......... *F16K 27/041* (2013.01); *F16K 15/063* (2013.01)

(58) Field of Classification Search
CPC .... F16K 27/041; F16K 15/063; F16K 15/025; F16K 27/0209; Y10T 137/7925
See application file for complete search history.

(56) References Cited

U.S. PATENT DOCUMENTS

| | | | |
|---|---|---|---|
| 1,664,043 A | 3/1928 | Niclausse | |
| 5,271,429 A * | 12/1993 | Bauer | F16K 27/02 137/543.23 |
| 2011/0076171 A1 * | 3/2011 | Park | F16K 15/026 417/571 |

FOREIGN PATENT DOCUMENTS

| | | |
|---|---|---|
| DE | 19731557 A1 | 1/1999 |
| DE | 20108618 U1 | 10/2002 |
| DE | 102006007583 A1 | 8/2007 |
| DE | 102006010706 A1 | 9/2007 |
| DE | 102007035706 A1 | 8/2008 |

(Continued)

*Primary Examiner* — P. Macade Nichols

(57) ABSTRACT

A valve device includes a valve socket with a valve seat having internal radius, a valve disposed in the valve socket, and a first flow channel. The valve includes a valve housing, an inlet opening, a flow opening, and a stop. The valve housing includes a first housing portion sitting in the valve seat, and a second housing portion adjoining the first housing portion. The inlet opening is formed opposite the first housing portion and the flow opening is formed on the second housing portion. The stop sits on the valve housing at the inlet opening and radially protrudes beyond the valve housing. The stop includes a radial stop dimension greater than the valve seat internal radius, the radial stop dimension being a smallest radial distance between the valve axis and an area of the stop farthest from the valve axis. The first flow channel leads to the inlet opening.

20 Claims, 3 Drawing Sheets

(56) References Cited

FOREIGN PATENT DOCUMENTS

| | | |
|---|---|---|
| DE | 102007029466 A1 | 1/2009 |
| DE | 102007040691 A1 | 3/2009 |
| DE | 102012021683 A1 | 5/2014 |
| DE | 102018131097 A1 | 5/2020 |
| DE | 102018132022 A1 | 6/2020 |
| DE | 102019120224 A1 | 8/2020 |
| DE | 102019132416 A1 | 6/2021 |
| EP | 1411283 A2 | 4/2004 |
| JP | 2014181765 A | 9/2014 |

\* cited by examiner

VALVE DEVICE HAVING A VALVE SITTING IN A VALVE SOCKET

CROSS-REFERENCE TO RELATED APPLICATIONS

This application is the United States National Phase of PCT Appln. No. PCT/DE2021/100493 filed Jun. 9, 2021, which claims priority to German Application No. DE102020116992.2 filed Jun. 29, 2020, the entire disclosures of which are incorporated by reference herein.

TECHNICAL FIELD

The present disclosure relates to a valve device having a valve sitting in a valve socket. The valve has a valve axis running lengthwise in two opposite axial directions, a valve housing running coaxially with the valve axis, and at least one stop sitting on the valve housing. The valve socket is provided with an internally cylindrical valve seat, in which the valve sits with an externally cylindrical first housing portion of the valve housing.

BACKGROUND

The valves of the sort used in the device of the type are used, for example, for pressure regulation in converter transmissions. An example of an application is disclosed in DE 10 2007 035 706 A1. This valve is designed as a non-return valve, sits in a transmission input shaft, and is housed in a hydraulic circuit of an automatic transmission. It has a valve housing made of sheet metal and a seal. The seal is an O-ring sitting in a circumferential groove at the inlet opening of the valve housing. At the edge of the inlet opening, the sheet metal of the valve housing is shaped in the form of a drain for accommodating the O-ring.

A further valve is disclosed in DE 10 2006 010 706 A1. The valve housing of the valve is a formed sheet metal part. The piston of this valve is a ball which is axially biased by means of a compression spring against a piston sealing seat at the inlet opening of the valve housing. The valve housing has a 2-step design, i.e., it has a first housing portion and a second housing portion. The diameters of the housing portions differ. The external diameter of the first housing portion is greater than the external diameter of the second housing portion. A support element, on which the compression spring is supported axially, is introduced into the valve at its rear.

A valve device of the sort having an electromagnetic valve is described in DE 10 2007 040 691 A1. The valve device has a housing upper part having a magnetic core and a valve having a valve housing, which are arranged axially adjacent to one another and coaxially to one another. A piston rod of the piston of the valve dips into the upper part of the housing and interacts with a magnet armature. The housing of the valve sits in a valve socket of a socket body and is fixed to said socket body by a caulking of a flange. The flange is formed integrally with the valve housing as a stop against the socket body and protrudes in a radial direction beyond the valve housing. An O-ring is clamped between the flange and the socket body.

A further valve is described in DE 10 2006 007 583. An external part of the valve housing having an inlet opening formed on the end face is supported in an axial direction in a valve socket formed as a blind hole. An internal part of the valve housing serves as a guide for a sealing ball of the valve and as a support for the piston spring of the sealing ball in an opposite axial direction. Moreover, the valve is supported axially in the opposite axial direction via a sleeve of the internal part on a retaining ring that sits in the bore of the valve socket. For this purpose, the sleeve overlaps the external part of the valve housing on a side facing away from the inlet opening. Moreover, a seal executed as an O-ring is clamped between the external part and the valve socket and held in position by the sleeve.

When the valve is installed in the housing, the valves from the known prior art initially have the option of inserting the valve into the valve seat of the housing either with one side or with the other side first, regardless of the direction of installation required for the valve to work. It can therefore lead to errors in the assembly of the valve into the housing such that it is installed upside down. If this error remains undetected during further assembly of the transmission, it will not work when operated. Time-consuming error detection and repairs will be necessary or the transmission has to be disposed of.

Such a valve is described, for example, in DE 10 2007 029 466 A1. The valve has an external diameter throughout, subject to two beads. A seal in the form of an O-ring sits in one of the beads. Since both ends of the valve have the same diameter, it could also be inserted into a valve socket the wrong way round.

SUMMARY

The present disclosure provides a valve device having a valve that is easy to manufacture and in which incorrect assembly of the valve is ruled out.

The disclosed device is formed by a housing and a valve sitting in a valve socket of the housing as well as by at least one axial stop. The radially and axially rigid stop sits on the valve housing of the valve. The stop is designed such that the radially extending greatest stop dimension is greater than the internal diameter of the valve seat in a housing. The stop dimension is defined by a radial distance between the valve axis and a radially most distant portion or body edge of the stop. The housing is, for example, a housing portion of a housing of a vehicle transmission, a transmission shaft, a hub or any other component in which the valve socket can be formed. In this case, the valve seat is defined as a socket, e.g., as a bore, in which the valve is inserted, held and/or pressed.

The present disclosure provides that
the stop sits on the valve housing at an inlet opening of the valve, wherein a first flow channel of the valve device leads to the inlet opening and wherein the inlet opening is formed at a first end of the valve which is axially distant from a second end of the valve which has the first housing portion,
at least one flow opening, oriented radially, i.e., transversely to the valve axis, is formed on a second housing portion of the valve housing, which axially adjoins the first housing portion.

The valve housing, together with the stop, prevents the incorrect assembly described above. The stop may be designed as a seal, a sealing lip of a seal, or as a reinforcement of a seal. The stop serves as an axial stop that prevents the valve from being inserted upside down, i.e., inserted into the valve seat with its inlet opening and/or seal first. The external diameter of the stop, or the external diameter of the seal, and/or the external diameter of the reinforcement of the seal is/are greater than the internal diameter of the valve seat in the housing. Usually, the valve has to be fully accommodated in the valve socket. If the valve is inserted upside down into the socket of the housing with the inlet opening first, it can only be moved axially until the stop axially strikes the contour delimiting the opening of the valve seat. In this case, the back of the valve obviously protrudes axially beyond the socket such that this is recognized as an error. The error is therefore detected in good time before the further assembly of the transmission, and can be corrected.

An example embodiment provides that the valve socket is provided with an insertion opening which is internally provided with an internally cylindrical sealing surface. The seal radially bridges the first annular gap formed between the valve housing and the insertion opening and is elastically biased radially against an internally cylindrical contour of the insertion opening. The internal contour of the first annular gap may be adapted to the external contour of the valve housing at this site. The internal contour of the housing surrounding the first annular gap or of the valve socket of the housing is internally cylindrical and aligned coaxially to the valve axis and forms the insertion opening for the valve into the valve socket.

It turns out that the internal diameter of the internally cylindrical contour of the insertion opening corresponds to the external diameter of the first annular gap. The external diameter of the first annular gap is therefore smaller than and/or equal to the external diameter of a second annular gap. The second annular gap axially adjoins the first annular gap. If the second annular gap is not externally cylindrical on the outside, the second annular gap must offer so much free space radially that it is described radially on the outside by a minimum radius of an imaginary hollow cylinder. The minimum radius must be equal to, or greater than, the internal diameter of the valve seat, so that the first housing portion of the valve housing can be inserted axially through the first passage cross-section into the valve seat unhindered. The free cross-section of the second annular gap, which is delimited on the outside by the internal contour of the housing and which surrounds the second housing portion of the valve housing and which axially follows the insertion opening, must therefore have at least the dimensions of the hollow cylinder on its outside. In practice, the annular gap can also be optionally radially expanded with respect to the cross-section of the insertion opening.

A prerequisite for the function of the valve is that a flow opening designed as a transverse opening is directly opposite the open cross-section of a flow channel running in the housing. In the interest of an unhindered flow passage, it should not or must not be partially or completely covered by a housing portion. Only in this way can the flow medium flow unhindered out of the valve into the flow channel or the other way round: out of the flow channel into the interior of the valve via the flow opening.

When assembling the valve devices according to the prior art, the valve must therefore be inserted into the valve socket in such a targeted manner that in the final position of the valve, the first opening and the flow channel are directly opposite one another and are not offset from one another.

In the valve device according to the present disclosure, however, it is provided that the second annular gap is formed radially between the second housing portion of the valve housing and an internal contour of the valve socket of the housing. The flow channel opens into the second annular gap. The flow opening is formed on the second housing portion in the valve housing, which is surrounded by the second annular gap. The flow opening or a plurality of flow openings adjacent to one another on the circumferential side open into said second annular gap, through which a radial distance is created between the valve and the flow channel or flow channels in the housing. Irrespective of the orientation of the valve, the second annular gap creates a sufficient flow cross-section for the flow medium to flow between the valve housing and the housing—regardless of whether or not the flow opening is directly opposite the inlet of a flow channel. Regarding the position of the flow opening of the valve in the circumferential direction, it is not necessary to mount the valve in such a way that the first opening and the inlet of the flow channel have to be directly opposite one another. The assembly of the valve is simplified.

The housing may be a housing of a vehicle transmission or a vehicle clutch. Housings are broadly understood to mean all components of a housing, but also other components such as housings of pumps, gear wheels and shafts. The housing is provided with an internally cylindrical valve seat, which is, for example, a socket bore and forms a seat for the valve housing. The valve sits in the valve seat with the valve housing having narrow radial clearance or by means of a press fit and is thus guided or held radially in the housing.

The valve may be designed to be essentially rotationally symmetrical. This applies to both the valve housing and the piston. The axis of symmetry is the valve axis, which is defined as axially aligned in the longitudinal direction for a better understanding of the "axial" and "radial" directions. For the description of the present disclosure, axial is therefore consistently defined as aligned with the valve axis, and radial is defined as aligned transversely to the longitudinal direction or to the valve axis.

The valve housing can be formed integrally or composed of multiple parts. The valve housing may be made of sheet metal by cold forming. The valve housing is divided into at least two housing portions. The valve sits in the valve seat with the first housing portion. The second housing portion has the at least one flow opening and is surrounded by the second annular gap. The second annular gap is a radial free space between the valve housing and an internal contour of the valve socket of the housing, the internal contour of which is defined by the external contour of the second housing portion of the valve housing. The external contour of the second annular gap can be of any spatial design, for example with axial and radial undercuts and radial depressions and projections. However, the radial depressions and projections do not protrude into the second annular gap.

As already mentioned above, the valve housing has at least one flow opening. Said flow opening can also be referred to as a transverse opening, because it is predominantly aligned transversely to the valve axis—which also does not rule out an oblique alignment that deviates from a right angle with respect to the valve axis. When flow medium is exchanged between the interior of the valve housing and its surroundings, the general flow direction of the flow medium at the flow opening is therefore initially transverse or oblique to the valve axis. The valve housing has at least one flow opening, but also, alternatively, a plurality of flow openings adjacent to one another on the circumference or axially adjacent to one another. If multiple flow openings are formed, they can also be axially offset from one another.

The second annular gap is delimited radially in one direction by the second housing portion and radially in the other direction by wall portions of the housing on the valve socket, wherein the wall portions of the housing may also be interrupted by openings of flow channels for the flow medium. The flow medium is exchanged alternately via the second annular gap and the interior of the valve and through the flow opening(s) in both directions. Alternatively, the flow medium leaves the valve via the flow opening(s) and flows from there into the second annular gap and possibly further into other components via flow channels. The external contour of the second annular gap must fit at least one imaginary hollow cylinder aligned concentrically to the valve axis in such a way that its radius is greater than the radius of the valve seat. Only in this way can the valve be guided with the rear side first, i.e., with the first housing portion first, first through the insertion opening and then through the valve socket to the valve seat and finally inserted or pressed into the valve seat with a precise fit.

As already mentioned above, the free cross-section of the second annular gap on the valve socket, which is delimited by the internal contour of the housing, can have radial dimensions in the area of the second annular gap which are greater than the radius of the imaginary hollow cylinder. However, the free cross-section at this point must be at least great enough to form a narrowest free cross-section between opposing wall portions of the housing, which is defined by the radius of the hollow cylinder. In other words: The hollow cylinder thus defines a free cross-section that spreads out radially between the valve housing and the housing, which is necessary for the assembly of the valve and also serves to form the annular gap and which, however, based on the various designs of the housing, for example due to the position and geometry of flow channels in the housing, can be greater than the external radius of the hollow cylinder. It is therefore not ruled out that partially, at some sites, a radial distance between the external contour of the second housing portion and the internal contour of the housing results that is greater than the radius of the hollow cylinder.

The seal can be of any design and, in its simplest form, can be an O-ring. Alternatively, as a configuration of the invention provides, the seal can also have one or more sealing lips. The seals can be adapted to different pressure media or flow mediums or different pressures or temperatures with little effort and without changing the surrounding construction or without changing the valve in terms of geometric design and material. A further embodiment provides that the seal has a reinforcement. A reinforcement can serve as a basis for the application of multiple sealing lips of the same or different designs and/or reinforces the sealing lip(s). Moreover, a secure seat of the seal in the housing or on the valve housing can be ensured by means of a reinforcement.

The present disclosure provides as configurations a double-stepped, or alternatively triple-stepped, valve housing. The valve housing is stepped twice if the first housing portion and the second housing portion have different external diameters. The valve housing is triple-stepped if it has a third housing portion and this third housing portion has a different external diameter than the housing portion of the valve housing adjacent to the third housing portion. With such a stepping, on the one hand, with an otherwise unchanged structure of the valve, it is possible to adapt to changed installation conditions simply by changing the valve housing. On the other hand, the working cross-sections of the valve, such as the cross-section of the inlet opening, or the cross-sections of piston sealing seats for one or more pistons can be adapted to the desired operating conditions. Variable operating conditions are, for example, pressure and flow rate. In the same way, it can be adapted as desired to the functional or production-related installation conditions of the transmission.

One configuration provides at least one piston which is guided in the valve housing so that it can move axially along the valve axis and by means of which both the at least first opening and the second opening(s) can be sealed either selectively or at the same time.

Valve sockets for valves are usually relatively expensive to produce by machining. It is therefore advantageous if they have cross-sections that are as uniform as possible. As a rule, housings have a great volume and are, for example, cast. The sockets are either introduced completely by machining or machined at least in the final work steps. It is therefore easier, for example in the interest of forming the second annular gap, to create the same through the stepped design of the valve housing and to design the valve socket as a bore. One embodiment therefore provides that an external diameter of the second housing portion is smaller than the internal diameter of the valve seat in the housing. In this case, the external diameter of the second housing portion is therefore also smaller than the external diameter of the first housing portion sitting in the valve seat. The external diameter of the first housing portion and the internal diameter in the valve seat are the same in terms of nominal size and are tolerated differently from one another in such a way that the desired seat fit, for example a press fit, results.

A further configuration provides that an externally cylindrical third housing portion of the valve housing has an external diameter which is smaller than the first internal diameter of the inlet opening. Taking into account the aforementioned dimensions of the inlet opening of the housing, space is thus created for the seat of a well-sealing seal on the third housing portion between the valve housing and the housing. Moreover, the cross-section of the inlet opening of the valve can be kept small as required. However, for the resulting small diameter of the inlet opening not to have a negative effect on the cross-section of the piston guided in the second housing portion, one configuration provides that the third housing portion of the valve housing has an external diameter that is smaller than the external diameter of the valve housing on the second housing portion in which the piston is guided. In this way, the reaction behavior of the valve to pressure changes can be positively influenced, i.e., the surfaces of the piston can be made sufficiently great.

A further embodiment provides that the reinforcement has an external diameter which is smaller than or equal to the internal diameter of the valve seat. The diameter of the reinforcement and thus the inlet opening can be kept relatively small because the diameter of the seal can be kept small radially. The axial stop against incorrect assembly may be ensured on the one hand by the reinforcement and on the other hand by the portion of the sealing lip(s) which project radially beyond the reinforcement and which, despite their elasticity, are kept rigid enough due to the reinforcement in the zone defined by the stop dimension to resist misassembly of the valve. Consequently, one configuration provides that the sealing lip has an external diameter that is greater than the internal diameter of the valve socket. The reinforcement may be designed in the form of an annular disk, but can also consist of one or more radial segments.

BRIEF DESCRIPTION OF THE DRAWINGS

In the following, the present disclosure is explained in more detail with reference to an exemplary embodiment.

FIG. 2 shows a possible misassembly of the valve 2.

DETAILED DESCRIPTION

Figure 1:
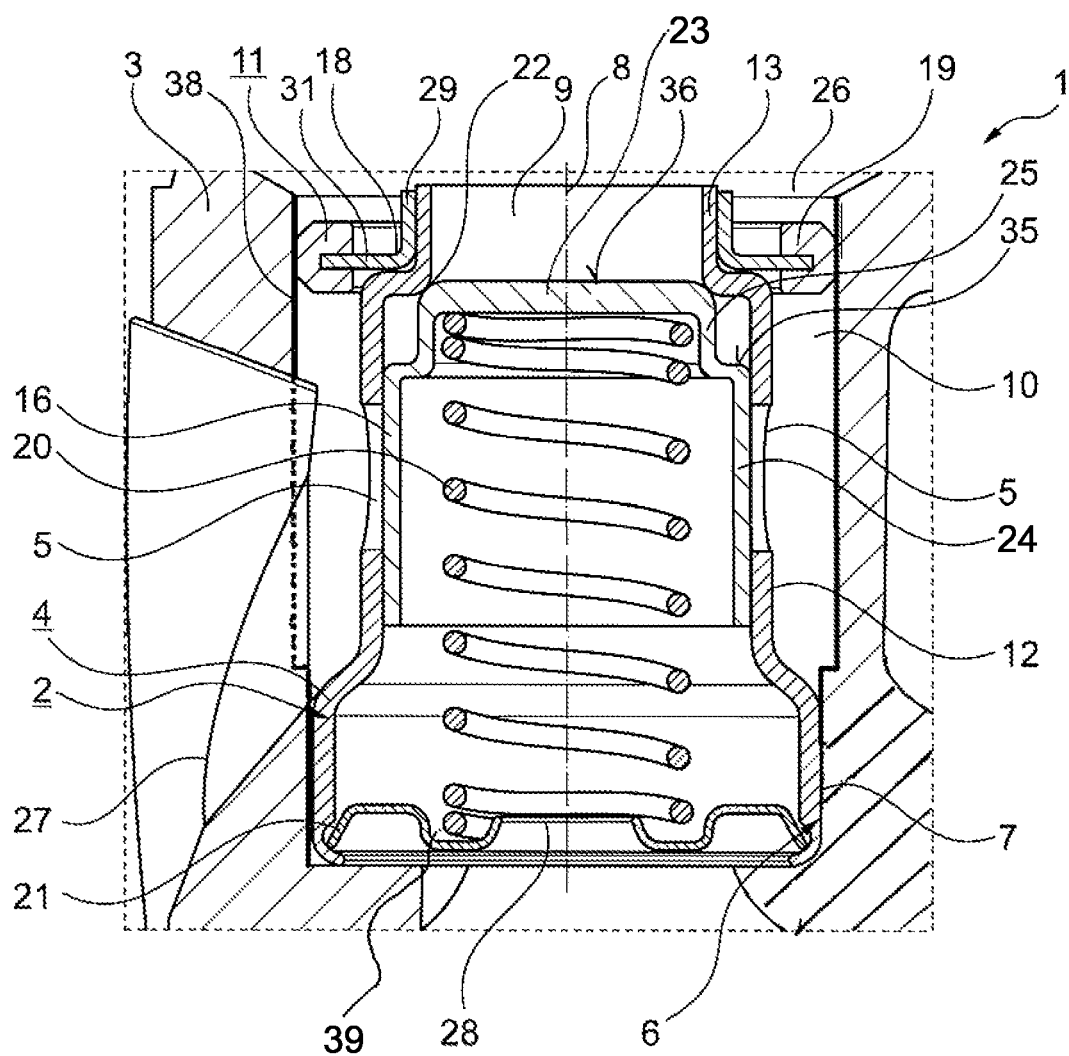
FIG. 1 shows a valve device 1, in which a valve 2 is installed as intended, in a longitudinal section along the valve axis 8.

The following description is made with reference to FIG. 1. The valve device 1 is formed from a housing 3 and a valve 2. The housing 3 is not shown in full. The valve 2 is provided with a seal 11. The valve 2 includes a valve housing 4, a piston 16, a spring 20 and a support element 21.

The valve housing 4 is executed in 3 steps and divided into a first housing portion 7, a second housing portion 12 and a third housing portion 13, wherein the housing portions 7, 12 and 13 are hollow-cylindrical. The first housing portion 7 is axially adjoined by the second housing portion 12 of the valve housing 4, which is axially aligned with the valve axis 8 of the valve 2. The third housing portion 13 in turn adjoins the second housing portion 12 axially. The valve housing 4 is provided with a plurality of (for example three or four) circumferentially distributed flow openings 5 and has an inlet opening 9 in the third portion 13 5 on the axial end face. The flow openings 5 are formed in the second housing portion 12 of the valve housing 4 and are aligned radially, i.e., transversely to the valve axis 8. The inlet opening 9 is formed on the end face of the third housing portion 13 and is axially aligned.

The piston 16 is designed in two steps with a first step 24 and a second step 25. An annular piston surface 35 is formed at the transition between the first step 24 and the second step 25. The piston head 23 on the second step 25 has a circular surface as the piston surface 36.

The support element 21 sits firmly in the first housing portion 7. The piston 16 is guided in the second housing portion 12 in an axially movable manner. The spring 20 is elastically clamped axially between the piston head 23 and the support element 21 and presses the piston 16 against the piston sealing seat 22. The spring 20 is guided axially in one direction in the second step 25 of the piston 16 and axially in the other direction at a centering 39 of the support element 21 in a radially centered manner. The piston 16 is guided radially in the second housing portion 12 via the first step 24 and seals the flow openings 5 with the first step 24 in the position shown.

Figure 1A:
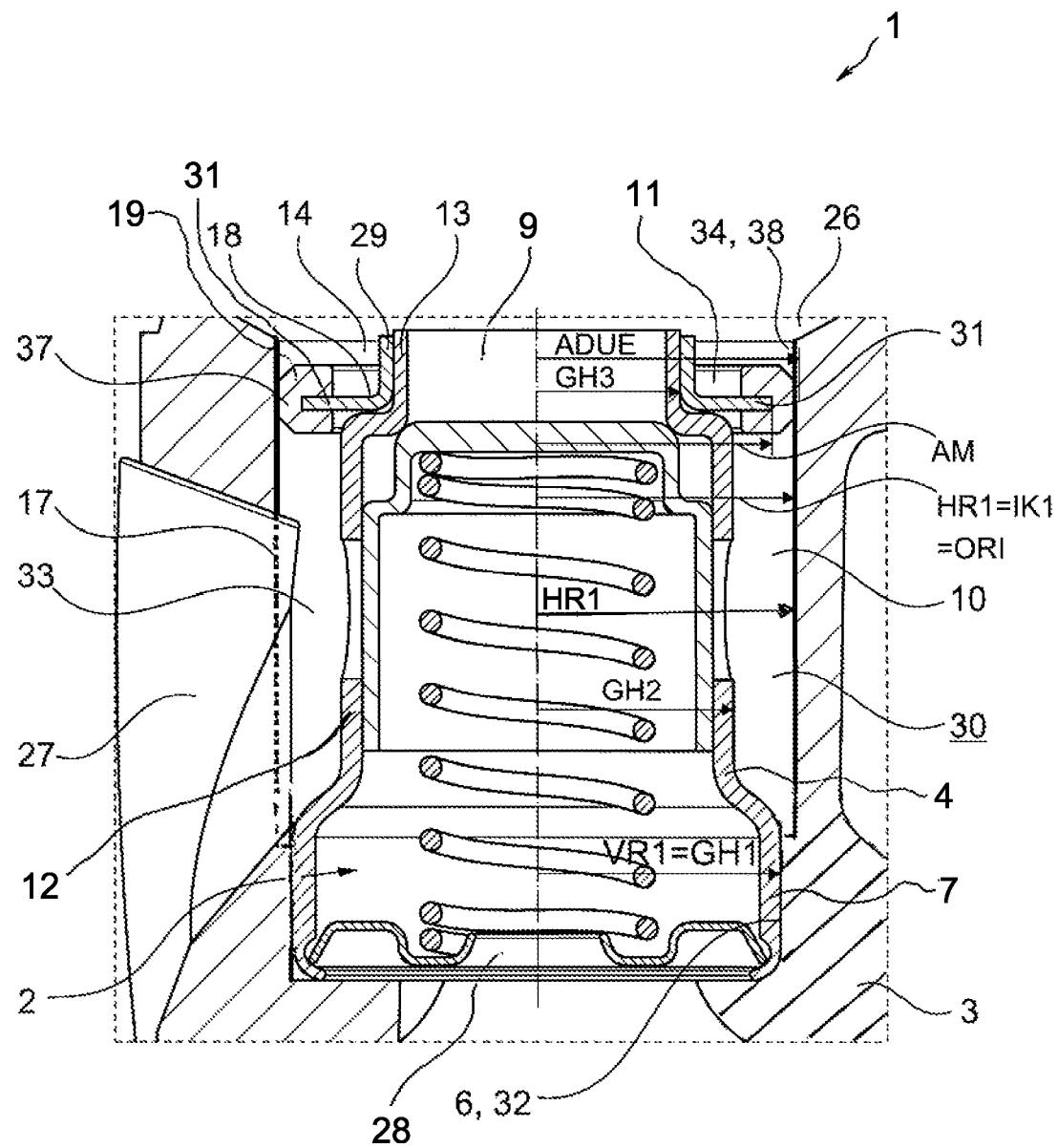
FIGS. 1a and 2 show different states of installation in the valve device 1 of the valve 2 shown in FIG. 1, in longitudinal sections along the valve axis 8. The valve 2 is shown inserted correctly in the illustration according to FIG. 1*a*.

The following description is made with reference to FIGS. 1 and 1*a*. FIG. 1*a* corresponds to the representation according to FIG. 1. The valve 2 is pressed into the valve seat 6 of the housing 3 at the rear with the first housing portion 7. The second housing portion 12 is surrounded by a second annular gap 10 which is formed radially between the valve housing 4 and an internal contour of the valve socket 30. The third housing portion 13 of the valve housing 4 is surrounded by the first annular gap 14 which is formed radially between an internally cylindrical surface of the insertion opening 38 and the valve housing 4. The seal 11 sits on the third housing portion 13 and seals the first annular gap 14 in such a way that a passage for flow medium between a first flow channel 26 and the second annular gap 10 is sealed. The seal 11 includes a reinforcement 18 and at least one sealing lip 19. The reinforcement 18 is an angle ring which sits on the third housing portion 13 with an axially aligned leg 29 and which holds the sealing lip 19 on a radially aligned leg 31.

The flow channel 26 leads to the insertion opening 38 and thus to the inlet opening 9 of the valve housing 4. At least one flow channel 27 opens into the second annular gap 10. A vent hole 28 is formed in the support member 21 at the rear of the piston 16. The valve 2 is closed in the operating state of valve 2 shown in FIG. 1. The piston 16 is shown in sealing contact with a piston sealing seat 22 (FIG. 1), which is formed at the transition between the second housing portion 12 and the third housing portion 13 of the valve housing.

Figure 2:
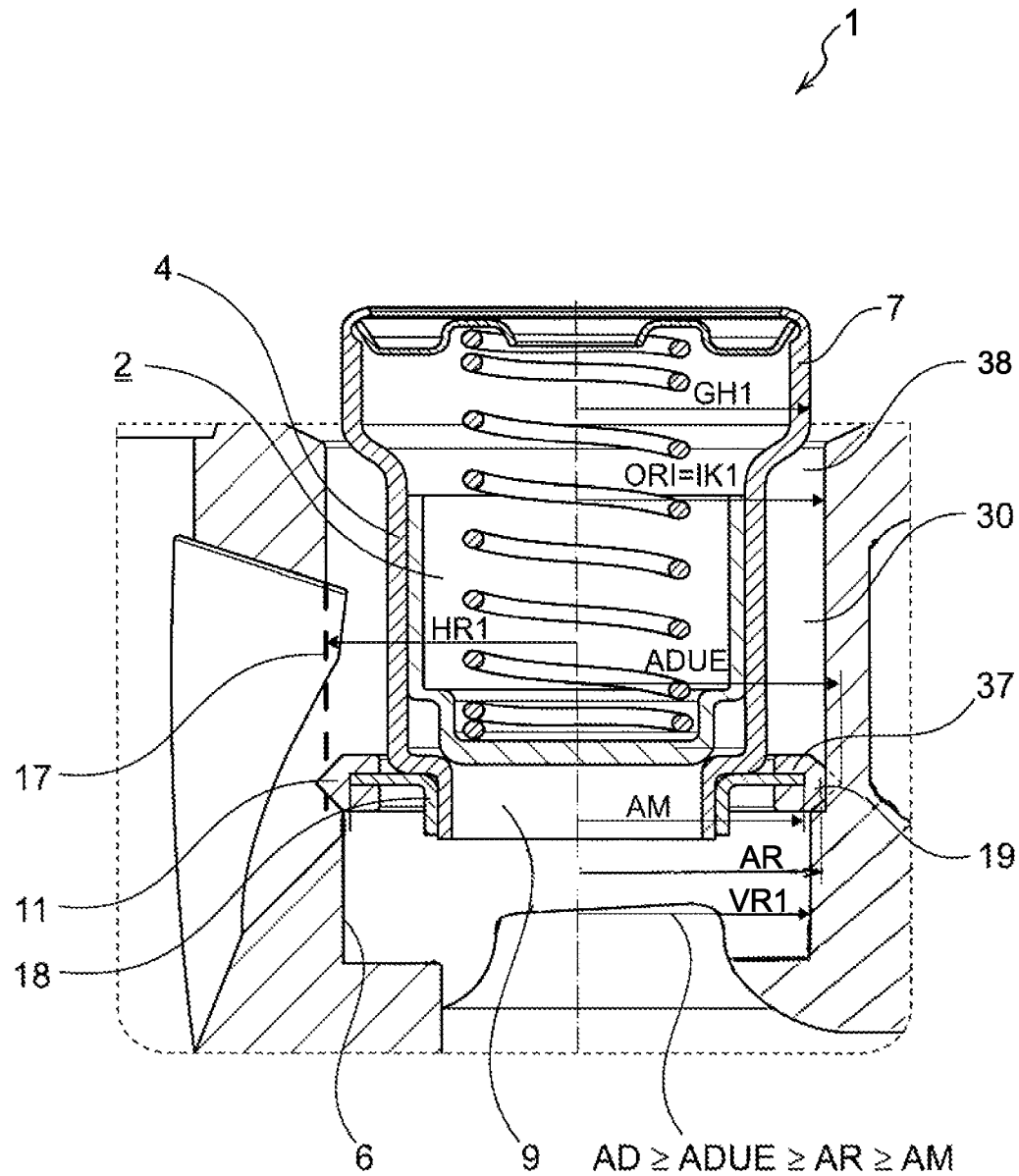

The following description is made with reference to FIGS. 1*a* and 2. The correct installation position of valve 2 in the valve device 1 is shown in FIG. 1 with the installation dimensions marked. FIG. 2, on the other hand, shows the position of a valve 2 inserted incorrectly into a valve socket 30 as a result of incorrect assembly. The valve socket 30 is a cavity in the housing of a vehicle transmission or other component of a vehicle transmission in which the valve 2 is inserted.

Returning to FIG. 1*a*, the housing 3 is provided with the valve socket 30 and has a valve seat 6, a flow channel 26 and at least one flow channel 27 and an insertion opening 38. The valve socket 30 is executed with at least three steps in terms of the diameter of its openings. The first opening step 32 is formed by valve seat 6. The second opening step 33 is formed by an internally cylindrical portion of the valve socket 30, which surrounds at least the second housing portion 12 of the valve housing 4. The third opening step 34 describes the insertion opening 38.

The internally cylindrical valve seat 6 is described by a valve seat internal radius VR1. The internal diameter of the valve seat 6 is therefore that of the first opening step 32 of the valve socket 30 and corresponds in nominal size to the external radius GH1 of the first housing portion 7 of the valve housing 4.

The second opening step 33 has at least one free radial cross-section, the internal diameter of which is described by the hollow cylinder radius HR1 of an imaginary hollow cylinder 17. The imaginary hollow cylinder, recognizable by the transition to a flow channel 27, is dashed on one side and shown on the right in the image with a bold/highlighted body edge, and describes the least given external outline of the second annular gap 10. From this it follows that the second annular gap 10 is described on the outside at least by the hollow cylinder radius HR1.

The second annular gap 10 has an internal diameter that describes twice the external radius GH2 of the second housing portion 12 of the valve housing 4.

The first annular gap 14, which is formed between the third housing portion 13 and the internal contour of the insertion opening 38, has an external diameter that corresponds to the internal radius IK1 of the internally cylindrical internal contour of the insertion opening 38 of the valve socket 30. In this case, the internal radius IK1 of the internally cylindrical internal contour of the insertion opening 38 also corresponds to a hollow cylinder radius HR1 of an imaginary hollow cylinder 17 and can also differ from the same in other installation situations that are not shown. The internal diameter of the first annular gap 14 corresponds to twice the external radius GH3 of the third housing portion 13.

As shown in FIGS. 1*a* and 2, the elastic sealing lip 19 has an external radius AD, which can be steplessly elastically reduced to the external radius ADUE and, in the case of the example shown in FIG. 2, is oversized compared to the internal radius IK1 of the insertion opening 38—i.e., is greater than the internal radius IK1 when the valve is not installed. This is indicated graphically in the representation according to FIG. 2 by the dashed lines of the sealing lip 19 extending beyond the drawn body edges of the internal contour in the image 10 on the right. In the installed state of the valve 2, the radius AD or ADUE is reduced to the internal radius IK1 of the body edge of the internally cylindrical internal contour of the insertion opening 38. In this case, the sealing lip 19 is elastically constricted or folded over to an external diameter predetermined by the internal radius IK1. Alternatively, it is possible for the external radius AD to correspond to the nominal size of the internal radius IK1 even when the valve 2 is not installed. The internal radius ORI of the insertion opening 38 may or may not be equal to the internal radius IK1 of the internal contour of the insertion opening 38. The internal radius IK1 of the internal contour determines the sealing contact between the sealing lip 19 and the housing 3. The internal radius ORI describes the narrowest or widest opening cross-section of the insertion opening 38, which can be greater than or equal to the dimensions of the sealing surface on the housing 3.

As shown in FIG. 2, ORI must be greater than the stop dimension AR. The stop dimension AR must be greater than the radius VR1 of the valve seat 6.

As shown in FIG. 1a, the internal contour of the reinforcement 18 or of its leg 29 corresponds in nominal size to the external radius GH3 of the third housing portion 13. The radially running leg 31 of the reinforcement 18 is described on the outside by an external radius AM, which is smaller than the internal radius IK1 of the insertion opening 38 but also smaller than the external diameter AD or ADUE of the sealing lip 19.

As shown in FIG. 2, the radial dimension AR of the stop 37 is a radius, since both the seal 11 and the reinforcement 18 are rotationally symmetrical components. The radius AR is greater than the radius AM of the reinforcement but also smaller than the external radius AD/ADUE of the sealing lip 19 both in the uninstalled and in the installed state and equal to or greater than the internal radius of the valve seat 6, which corresponds to the external radius GH1 of the first housing portion 7 of the valve housing 4.

In summary, the external radius AD of the sealing lip 19 when the valve 2 is not installed can be greater than or equal to the external diameter ADUE of the sealing lip when the valve 2 is installed. The radial stop dimension AR of the stop 37 can be greater than or equal to the radial dimension AM of the reinforcement 18 and must be greater than the internal radius of the internally cylindrical wall of the valve seat 6, wherein the nominal size of the internal radius VR1 of the valve seat 6 corresponds to the nominal size of the external radius GH1 of the first housing portion 7 of the valve housing 4. AR>GH1=VR1 and AD≥ADUE≥AR≥AM;

As shown in FIG. 2, a valve 2 is accidentally inserted into the valve socket 30 with the inlet opening 9 and thus also with the seal 11 first, until the seal 11 rests or abuts axially on the first opening step, i.e., on the edge of the valve seat 6. This is because at least the radial stop dimension AR of the stop 37 or even the external radius AD of the sealing lip 19 is smaller than the opening internal radius ORI of the insertion opening 38 or the internal radius IK1 of the internally cylindrical internal contour of the insertion opening 38 and also smaller than that of the hollow cylinder radius HR1 of the imaginary hollow cylinder 17. The stop 37 is formed in this case by a radial portion of the seal 11 reinforced and supported by the reinforcement 18 with a radius denoted as the radial stop dimension AR of the stop 37. In this case, the sealing lip 19 or seal 11 is at least rigid as the stop 37 such that, when the valve 2 is inserted further into the valve socket, it exerts an axially directed resistance force that prevents easy insertion of the seal 11 into the valve seat 6. In this position, the rear end of the valve 2 or of the first housing portion 7 protrudes beyond the edge of the insertion opening 38, making the misassembled position of the valve 2 clearly visible.

In other cases that are not shown, the radial stop dimension AR of the stop 37 can also be the same size or smaller than the external radius AM of the reinforcement 18. In this case, the external radius of the reinforcement 18 would be greater than the internal radius of the valve seat 6. In other cases that are not shown, the stop radius AR can also be equal to the external radius AD of the sealing lip. If the valve 2 or the valve housing 4 has a stepped design as shown, the radial stop dimension AR must be smaller than or equal to the internal radius IK1 of the internally cylindrical internal contour of the insertion opening 38.

Returning to FIG. 1a, the internal radius IK1 of the internally cylindrical internal contour of the insertion opening 38 must be greater for such a stepped valve 2 than the external radius GH1 of the first housing portion 7 of the valve housing 4. The opening internal radius ORI of the insertion opening 38 must therefore be great enough (the opening internal radius ORI is greater than that of the external radius GH1 of the first housing portion 7) to allow insertion of the valve 2 into the valve socket 30 with the first housing portion 7 first and in such a way that the first housing portion 7 ends up sitting in the valve seat 6, as shown. In the case shown, the seal 11 and the stop 37 are designed as one component, so that the opening internal radius ORI of the insertion opening 38 is the same size as the internal radius IK1 of the internally cylindrical internal contour of the insertion opening 38, on which the sealing lip 19 is supported. Alternatively, there are also installation situations not shown in which the internal radius IK1 of the internally cylindrical internal contour of the insertion opening 38 is greater than the opening internal radius ORI of the insertion opening 38.

REFERENCE NUMERALS 1 valve device
2 valve
3 housing
4 valve housing of the valve
5 flow openings of the valve housing
6 valve seat in the housing
7 first housing portion of the valve housing
8 valve axis of the valve
9 inlet opening in the valve housing
10 second annular gap
11 seal
12 second housing portion of the valve housing
13 third housing portion of the valve housing
14 first annular gap
16 piston
17 imaginary hollow cylinder
18 reinforcement
19 sealing lip
20 spring
21 support element
22 piston sealing seat
23 piston head
24 first step of the piston
25 second step of the piston
26 flow channel
27 flow channel
28 vent opening
29 leg of the reinforcement
30 valve socket of the housing 31 leg of the reinforcement
32 first opening step of the valve socket
33 second opening step of the valve socket
34 third opening step of the valve socket
35 annular piston surface
36 piston surface
37 stop
38 insertion opening
39 centering of support element
AR radial stop dimension of stop 37, measured from valve axis 8;
VR1 valve seat internal radius of valve seat 6, measured from valve axis 8;
ORI opening internal radius of insertion opening 38, measured from valve axis 8;
HR1 hollow cylinder radius of the imaginary hollow cylinder 17, measured from valve axis 8;
GH1 external radius of the first housing portion 7 of valve housing 4, measured from valve axis 8;
GH2 external radius of the second housing portion 12 of valve housing 4, measured from valve axis 8;
GH3 external radius of the third housing portion 13 of valve housing 4, measured from valve axis 8;
IK1 internal radius of the internally cylindrical internal contour of insertion opening 38, measured from valve axis 8;
AM external radius of reinforcement 18, measured from valve axis 8;
AD or ADUE external radius of the sealing lip, measured from valve axis 8

The invention claimed is:

1. A valve device having a valve sitting in a valve socket, wherein:
    the valve has a valve axis running lengthwise in two opposite axial directions, a valve housing running coaxially with the valve axis, and at least one stop sitting on the valve housing,
    the valve socket is provided with an internally cylindrical valve seat, in which an externally cylindrical first housing portion of the valve housing of the valve sits,
    the valve seat is described by a valve seat internal radius (VR1),
    the stop radially protrudes beyond the valve housing, wherein a radial stop dimension (AR) of the stop is greater than the valve seat internal radius (VR1) and wherein the radial stop dimension (AR) is a smallest radial distance between the valve axis and an area of the stop radially removed farthest from the valve axis,
    the stop sits on the valve housing at an inlet opening of the valve, wherein a first flow channel of the valve device leads to the inlet opening and wherein the inlet opening is formed at a first end of the valve which is axially removed from a second end of the valve having the externally cylindrical first housing portion,
    at least one flow opening aligned radially, i.e., transversely to the valve axis, is formed on a second housing portion of the valve housing axially adjoining the externally cylindrical first housing portion.

2. The valve device according to claim 1, in which the valve socket is provided with an insertion opening, wherein the insertion opening merges into the first flow channel of the valve device, and wherein the valve housing and an internally cylindrical contour of the insertion opening are radially opposite one another without contact, wherein an opening internal radius (ORI) of the internally cylindrical contour of the insertion opening is greater than the radial stop dimension (AR).

3. The valve device according to claim 1, in which the stop is formed on at least one elastic sealing lip, wherein the at least one elastic sealing lip is arranged radially between the valve housing and the valve socket and is sealingly supported against an internal contour of the valve socket.

4. The valve device according to claim 1, in which the stop is annularly formed around the valve axis.

5. The valve device according to claim 1, in which a seal running around the valve axis sits on the valve housing and bridges a first annular gap formed between the valve housing and an internally cylindrical contour of the valve socket in a radially sealing manner.

6. The valve device according to claim 5, in which the seal is provided with the at least one stop.

7. The valve device according to claim 1, in which the stop is formed by at least one reinforcement, to which at least one elastic sealing lip of a seal is fixed, wherein the seal sealingly bridges a first annular gap formed between the valve housing and an internally cylindrical internal contour of the valve socket, wherein the internally cylindrical internal contour has an internal radius (IK1), which is greater than the radial stop dimension (AR), and wherein the seal and a reinforcement of the seal form the stop as a unit.

8. The valve device according to claim 5, in which at least one flow medium is exchangeable between an interior of the valve and a second annular gap via the at least one flow opening, wherein the second housing portion and an internal contour of the valve socket surrounding the second housing portion lie radially opposite one another without contact at the second annular gap and wherein the internal contour of the valve socket at the second annular gap has at its narrowest point at least one radially free passage cross-section, in which an imaginary hollow cylinder running concentrically to the valve axis and describing the at least one radially free passage cross-section with a hollow cylinder radius (HR1) that is greater than the radial stop dimension (AR) and also greater than the valve seat internal radius (VR1) can pass unhindered.

9. The valve device according to claim 8, in which the second housing portion has an external radius (GH2) that is smaller than the valve seat internal radius (VR1).

10. The valve device according to claim 8, having an externally cylindrical third housing portion of the valve housing, on which the stop sits, wherein the externally cylindrical third housing portion has an external radius (GH3) that is smaller than that valve seat radius (VR1).

11. The valve device according to claim 1, in which at least one piston in the second housing portion is guided in an axially movable manner along the valve axis, wherein the at least one flow opening and the inlet opening operatively connected to the valve socket flow-wise is sealable by the piston.

12. A valve device comprising:
    a valve socket comprising an internally cylindrical valve seat described by a valve seat internal radius;
    a valve disposed in the valve socket, the valve comprising:
        a valve axis running lengthwise in two opposite axial directions;
        a valve housing running coaxially with the valve axis, the valve housing comprising:
            an externally cylindrical first housing portion sitting in the internally cylindrical valve seat; and
            a second housing portion axially adjoining the externally cylindrical first housing portion;
        an inlet opening formed at an end of the valve opposite the externally cylindrical first housing portion;

a flow opening formed on the second housing portion and aligned transverse to the valve axis; and a stop sitting on the valve housing at the inlet opening and radially protruding beyond the valve housing, the stop comprising:
- a radial stop dimension greater than the valve seat internal radius, the radial stop dimension being a smallest radial distance between the valve axis and an area of the stop farthest from the valve axis; and a first flow channel leading to the inlet opening.

13. The valve device of claim 12, wherein:

the valve socket further comprises an insertion opening that merges into the first flow channel;

the insertion opening comprises an internal cylindrical contour with an opening internal radius;

the valve housing and the internal cylindrical contour are radially opposite one another without contact; and the opening internal radius is greater than the radial stop dimension.

14. The valve device of claim 12 wherein:

the valve further comprises an elastic sealing lip;

the elastic sealing lip is arranged radially between the valve housing and the valve socket and sealingly supported against an internal contour of the valve socket; and the stop is annularly formed around the valve axis on the elastic sealing lip.

15. The valve device of claim 12 wherein:

the valve further comprises a seal running around the valve axis;

the seal sits on the valve housing and bridges a first annular gap formed between the valve housing and an internally cylindrical contour of the valve socket in a radially sealing manner; and the seal comprises the stop.

16. The valve device of claim 12 wherein:

the valve socket comprises an internally cylindrical internal contour having an internal radius greater than the radial stop dimension;

the valve comprises:
- a reinforcement; and
- a seal having an elastic sealing lip fixed to the reinforcement;

the seal sealingly bridges a first annular gap formed between the valve housing and the internally cylindrical internal contour; and the stop is formed by the seal and the reinforcement as a unit.

17. The valve device of claim 16 further comprising a second annular gap formed between the second housing portion and an internal contour of the valve socket surrounding the second housing portion, wherein:

the valve socket comprises a radially free passage cross-section at a narrowest point of the internal contour of the valve socket surrounding the second housing portion;

an imaginary hollow cylinder concentric to the valve axis and describing the radially free passage cross-section with a hollow cylinder radius greater than the radial stop dimension and also greater than the valve seat internal radius can pass unhindered in the radially free passage cross-section;

the valve comprises an interior; and a flow medium is exchangeable between the interior and the second annular gap via the flow opening.

18. The valve device of claim 17 wherein the second housing portion comprises an external radius smaller than the valve seat internal radius.

19. The valve device of claim 17 wherein:

the valve housing further comprises an externally cylindrical third housing portion;

the stop sits on the externally cylindrical third housing portion; and the externally cylindrical third housing portion has an external radius that is smaller than the valve seat internal radius.

20. The valve device of claim 12 wherein:

the valve further comprises a piston disposed in the second housing portion;

the piston is guided in an axially movable manner along the valve axis; and the piston is arranged to seal a passage between the flow opening and the inlet opening.

* * * * *